United States Patent [19]

Maslen et al.

[11] 4,268,432
[45] May 19, 1981

[54] POLYAMIDE COMPOSITIONS

[75] Inventors: John Maslen, Hoddesdon; Eric Nield, Watton-at-Stone, both of England

[73] Assignee: Imperial Chemical Industries Limited, London, England

[21] Appl. No.: 48,772

[22] Filed: Jun. 15, 1979

Related U.S. Application Data

[63] Continuation of Ser. No. 803,234, Jun. 3, 1977, abandoned.

[30] Foreign Application Priority Data

Jun. 21, 1976 [GB] United Kingdom ............... 25641/76

[51] Int. Cl.³ .................. C08L 77/00; C08K 5/02; C08K 5/03
[52] U.S. Cl. ............... 260/45.75 B; 260/45.75 D; 260/45.75 W; 260/45.75 R; 525/432
[58] Field of Search ............ 260/45.7 RL, 42.56, 260/45.75 B, 45.75 P, 45.75 WP, 45.75 R, 857 TW; 525/432

[56] References Cited

U.S. PATENT DOCUMENTS

| 2,193,529 | 3/1940 | Coffman | 260/857 TW |
| 2,339,237 | 1/1944 | Brubaker | 260/857 TW |
| 3,382,204 | 5/1968 | Gouinlock | 260/45.75 B |
| 3,392,136 | 7/1968 | Hindersinn | 260/45.75 B |
| 3,403,036 | 9/1968 | Hindersinn | 260/45.75 B |
| 3,418,263 | 12/1968 | Hindersinn | 260/45.75 B |
| 3,418,267 | 12/1968 | Busse | 260/45.7 RL |
| 3,483,158 | 12/1969 | Beacham | 260/42.56 |
| 3,636,136 | 1/1972 | Konopik | 260/42.56 |
| 3,694,402 | 9/1972 | Maltby | 260/42.56 |
| 3,733,282 | 5/1973 | Habermeier | 260/830 TW |
| 3,810,861 | 5/1974 | Tacke | 260/45.7 RL |
| 4,143,026 | 3/1979 | Panek | 260/42.56 |

FOREIGN PATENT DOCUMENTS

| 649800 | 10/1962 | Canada | 260/42.56 |
| 734039 | 5/1966 | Canada | 260/857 TW |
| 2237957 | 2/1974 | Fed. Rep. of Germany . | |
| 51-49264 | 4/1976 | Japan | 260/42.56 |
| 1090598 | 11/1967 | United Kingdom . | |
| 1208865 | 10/1970 | United Kingdom . | |

Primary Examiner—Paul Lieberman
Attorney, Agent, or Firm—Cushman, Darby & Cushman

[57] ABSTRACT

A polyamide masterbatch composition containing at least 10% by weight of a polyamide with a melting point of 230° C. or below and at least 60% by weight of fire-retardant materials comprising halogenated organic compounds and optionally a synergist for the halogenated compounds.

13 Claims, No Drawings

POLYAMIDE COMPOSITIONS

This is a continuation of application Ser. No. 803,234 filed June 3, 1977 and now abandoned.

This invention relates to polyamide compositions and in particular to fire-retardant polyamide compositions.

The production of fire-retardant polyamide compositions can give rise to production problems when the polyamide is one having a melting point above about 250° C. and a high degree of fire-retardancy is required in the composition. These compositions are normally produced by intimately mixing the additives of the composition under melt conditions in an intensive mixer, such as a screw extruder, and extruding the composition in the form of a lace which is eventually cut into granules. In this process difficulties are experienced when the level of additives is high relative to the polymer content of the composition. The intensive mixing conditions needed to ensure that the additives are wetted by the polyamide and to produce a uniform composition may result in some degradation of the polyamide or decomposition or volatilisation of the fire retardant or both. These problems are intensified when using polyamides having a melting point above 250° C. because the high shearing forces required to get proper dispersion of a high concentration of additives in the polyamide is likely to result in local overheating in the extruder due to shear heating. This can result in the final product being of poor colour. The use of a finely divided polyamide improves the ease of dispersion and reduces overheating problems but this remedy increases the cost of processing because it is necessary to include the step of comminuting the polyamide before compounding. The use of processing temperatures near to the volatilisation temperature of the fire-retardant additives may also give rise to blockages in the vent of the extruder through which volatile materials are normally removed. Material caught in the blocked vents is likely to be subject to a heat treatment for considerably longer than the bulk of the material passing through the extruder. Some of this material can be re-entrained in the material passing through the extruder causing discolouration and even black specks in the final product emerging from the extruder.

It has been proposed to incorporate the large quantities of fire retardants required to make thermoplstics compositions resistant to burning by producing a masterbatch in which the fire-retardant additives are incorporated in an elastomer. The masterbatch is then added to the thermoplastics material in the proportion required to make the thermoplastics resistant to burning. However, the presence of even small quantities of the elastomer may affect the physical properties of the thermoplastics composition and may make it more difficult to achieve the required burning performance.

A masterbatch composition suitable for improving the burning performance of polyamides with a melting point of greater than about 250° C. has now been developed which does not cause any significant deterioration in the physical properties of the polyamide.

Accordingly there is provided a polyamide masterbatch composition comprising at least 10% by weight of the composition of a polyamide with a melting point of 230° C. or below and at least 60% by weight of the composition of halogen-containing fire-retardant additives. The halogen-containing fire-retardant additives may consist entirely of additives containing halogen or may be a mixture of such materials with non-halogen containing synergistic additives.

This masterbatch composition is suitable for blending with a polyamide having a melting point greater than about 250° C., such as nylon 66, for producing a fire-retardant composition.

Accordingly there is also provided a fire-retardant polyamide composition comprising from 5 to 50%, preferably 15 to 50%, by weight of a polyamide masterbatch composition comprising at least 10% by weight of the masterbatch composition of a polyamide having a melting point of 230° C. or below and at least 60% by weight of the masterbatch composition of halogen-containing fire-retardant additives, from 95 to 50% by weight of a second polyamide composition comprising a polyamide with a melting point of greater than about 250° C., such as nylon 66 or a copolymer of nylon 66 and from 0 to 40% by weight of the total composition of other additives, the combined percentage of masterbatch composition, second polyamide composition and other additive totalling 100%.

Both the masterbatch composition and the second polyamide composition may contain any of the conventional additives such as colouring materials, lubricants, heat and light stabilisers, track resistant additives, reinforcing and non-reinforcing fillers, although it is preferred that when it is necessary to include high concentrations of fillers they are present in the second polyamide composition. In addition, the total composition may contain up to 40% of these additives in addition to any present in the masterbatch or second polyamide composition.

The fire-retardant composition may be a simple dry blend of the masterbatch composition and the second polyamide composition which can be directly injection moulded into shaped articles. Alternatively the masterbatch can be compounded in an extruder together with the second polyamide composition and optionally with other additives such as glass fibre to give a uniform compounded blend of the components. It is preferred to use a simple dry blend because such a mixture can be directly injection moulded without further compounding to give shaped articles with improved mechanical properties when reinforcing agents are present in the blend.

The use of a polyamide melting below 230° C. as the carrier in the masterbatch composition permits the halogen-containing fire-retardant additives or other additives to be intimately dispersed throughout the carrier with much less risk of thermal decomposition of the fire-retardants. The use of such a polyamide at concentrations of below about 10% by weight of the final fire-retardant composition does not significantly affect the mechanical properties or burning performance of the final blend. The relatively mild conditions required to wet the fire-retardant additives ensure that the final fire-retardant blends are much less likely to contain degraded polyamide or degraded fire-retardant additives than a conventional polyamide composition prepared by compounding all the additives in a single stage process. The low probability of degraded polyamide or additives being present in the products of the invention gives rise to products of improved colour.

The polyamide of the masterbatch composition melting below 230° C. may be, for exaple, nylon 6 although it is preferred that it is a copolymer of nylon 66 containing a major proportion of hexamethylene adipamide units because when such a polyamide is used as the masterbatch carrier the proportion of polyamide other than nylon 66 is kept to a minimum. For example, when a nylon 66:6 copolymer containing about 70% of nylon 66 is used as the masterbatch carrier there is no difficulty in preparing a final blend which is fire retardant and which contains only about 1% by weight of the final blend of polyamide in the form of nylon 6 units. Nylon 66 copolymers melting below 230° C. generally contain not more than 80% by weight of nylon 66 units.

Whilst the masterbatch composition may be blended with any other polyamide it is particularly useful for blending with the higher melting point aliphatic polyamides, particularly nylon 66 and copolymers of nylon 66 melting above about 250° C. because as hereinbefore described there are production difficulties with the direct compounding of some fire-retardant compositions containing such polyamides. Nylon 66 copolymers melting above about 250° C. generally contain not less than 90% by weight of nylon 66 units.

The fire-retardant additives of the masterbatch composition comprise halogenated organic compounds containing a substantial proportion and preferably at least 50% by weight of halogen, optionally together with synergists for improving the efficiency of the fire retardants. Such synergists are almost invariably present in fire-retardant polyamide compositions but it will be appreciated that as well as being present in the masterbatch they can be introduced into the final fire-retardant composition as a constituent of the second polyamide composition or as an extra additive, particularly when the final composition is prepared by extrusion compounding. Whether the synergist is present in the masterbatch composition or in the second polyamide composition or as an extra additive the weight ratio of halogenated material to synergist should preferably be between 5:1 and 1:2. Particularly suitable fire retardants for polyamides are those described in British patent specification No. 1 090 598. The material sold by the Hooker Chemical Corporation under the trade name 'Dechlorane' having the chemical formula:

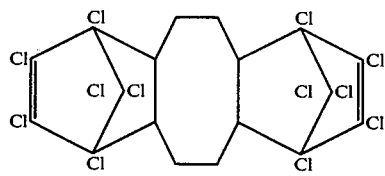

is an example of a material described in the aforesaid patent specification. Synergists for the halogenated organic compounds may be selected from a variety of compounds well known for this purpose. Particular mention is made of the oxides of Group Vb metals of the Periodic Table such as antimony oxide. Tin, zinc, iron and molybdenum oxides and zinc borate may also be used. These synergists may be used singly, in admixture or in the form of mixed oxides, such as zinc ferrite.

The concentration of fire retardant additives in the masterbatch should be as high as possible to reduce the amount of carrier polyamide in the final blend of fire retardant composition to a minimum. The upper limit of fire-retardant concentration is determined by the practical consideration of the minimum concentration of carrier polyamide required to wet out the fire-retardant additives and any other additives that may be present in the masterbatch composition. If significant quantities of additives remain unwetted the granules produced are too fragile to handle or may contain significant quantities of the additives in the form of dust. In general, the lowest concentration of polyamide that will achieve this function is about 10% by weight of the masterbatch composition so that up to about 90% by weight of the composition can consist of fire-retardant additives. Surprisingly, such a composition may be blended with the second polyamide composition and injection moulded to give shaped articles of uniform composition without any need for extra compounding operations to ensure intimate mixing of the fire retardants. In fact, such directly moulded articles show improved mechanical properties and colour to those moulded from similar compositions prepared by compounding all the ingredients required in the final composition in a single stage process. Articles directly moulded from dry blends of the masterbatch and the second polyamide also show superior mechanical properties to articles made from the same blend after it has been extrusion compounded to produce granules of a uniform composition prior to injection moulding.

The composition of the fire-retardant additives in the masterbatch will depend on the properties required of the final blended composition. In particular, the composition of fire retardants will vary depending on the degree of fire retardancy required in articles moulded from the composition. The fire retardancy of articles moulded from the composition is most suitably assessed by the method of the Underwriters Laboratories known as Test Standard UL94. Using the Vertical Burning Test of this Standard the blended compositions of the invention should preferably have a rating of at least 94VI when tested on samples having a thickness of 1.6 mm when conditioned at a relative humidity of 50% for 48 hours or when held at 70° C. in an air oven for one week. In a typical example the masterbatch composition would contain about 20% of polyamide, 50% chlorinated fire retardant, 25% of fire-retardant synergist with about 5% of auxiliary ingredients such as lubricants, stabilisers etc (all percentages being by weight of the masterbatch composition). As a rough guide, glass-filled compositions with a rating of 94VI on the aforementioned test could be prepared by blending about 15 parts of this masterbatch composition with 85 parts of a glass-filled nylon composition containing 20 to 40% by weight of glass. A rating of 94VO could be achieved using about 25 parts of the masterbatch to 75 parts of glass-filled compound. In order to prepare unfilled blends with the same levels of fire retardancy rather more of the masterbatch would be required. Typically, for 94VI and 94VO ratings on unfilled compositions, levels of about 25% and 30% by weight respectively of the masterbatch would be required in the final blend. As hereinbefore indicated the masterbatch composition may be dry blended with a second polyamide composition, optionally containing additives such as glass fibre. Alternatively, the masterbatch and the second polyamide may be compounded together in an extruder, optionally together with additives such as glass fibre so that the final fire-retardant composition is produced as a uniform composition.

The masterbatch and second polyamide components of the final composition are preferably produced in the form of granules because these are relatively easy to blend together in this form into a composition suitable for direct injection moulding into shaped articles. The components may be readily produced in granule form by extruding melts of the compositions through a die. The extrudate may then be chopped into granules of the desired size. For a polyamide component that contains additives the apparatus for melting and extruding the polyamide should have provision for intensive mixing of the components. A suitable apparatus is a single screw extruder although for the preparation of the masterbatch it is preferred that a more intensive mixer such as a twin screw extruder or a kneading extruder, for example a Buss Ko-kneader, is used. The most convenient method of blending the granules of the two components is by simply tumbling in an end-over-end mixer because this preserves the integrity of the granules and dusting and segregation is avoided as far as possible. Blending in high shear mixers should be avoided.

The invention is further illustrated by the following examples.

EXAMPLE 1

4 kg of nylon 6 powder was tumble blended with 10.4 kg 'Dechlorane' 515 supplied by the Hooker Chemical Co, 4.54 kg zinc oxide, 0.68 kg antimony trioxide with minor amounts of lubricant and mould release agent. The blend was fed to a Buss Ko-kneader (Model PR46) operating at a barrel temperature of about 225° C. and having a general purpose low compression screw, a barrel with a length/diameter ratio of 7:1 and having round mixing pegs set in rows along the barrel at 120° C. intervals. The PR46 had a cross-head extruder with a simple conveying screw with a length/diameter ratio of 3:1 and a multihole die with a die face cutter. The chip produced was collected in water to cool it.

EXAMPLE 2

The procedure of Example 1 was repeated using a tumbled blend of 4 kg nylon 6, 11.7 kg 'Dechlorane' 515, 3.9 kg antimony trioxide and minor amounts of lubricant and mould release agent.

EXAMPLE 3

The masterbatch granules of Example 1 were blended with nylon 66 granules containing 33% by weight of short glass fibre in the ratio 21 parts masterbatch to 79 parts glass-filled nylon 66. This blend was moulded directly by injection moulding and also compounded in a single screw extruder at 280° C. The resulting compound was extruded as a lace, chopped into granules and quenched in water. In a further comparative experiment the individual ingredients of the final composition were tumbled together in proportions necessary to give the composition of the final blend (with the exception of the nylon 6 carrier) and were then extrusion compounded together in a single screw extruder operating with a nominal barrel temperature of 280° C. The table below compares the results obtained from injection moulded samples produced by:

(a) direct injection moulding of the masterbatch of Example 1 and glass-filled nylon 66 granules in the weight ratio 21:79, (b) injection moulding following extrusion compounding of the blend of (a), and (c) injection moulding of the identical composition to (a) and (b), except in that the nylon 6 carrier was omitted, prepared by the single stage extrusion compounding.

| Run | Composition | Tensile[a] Strength MN/m$^2$ | Notched[b] Impact Strength KJ/m$^2$ | Fire[c] Retardancy 50% RH 48 hr | Fire[c] Retardancy 70° C. 7 days |
|---|---|---|---|---|---|
| 1 | 21 parts product of Example 1 + 79 part glass-filled nylon 66 granules | 137 | 6.0 | VI | VI |
| 2 | Blend as above extrusion compounded | 120 | 5.1 | VI | VI |
| 3 | Same composition as 1 and 2 prepared by single stage extrusion compounding | 125 | 5.0 | VI | VI |

[a]Measured using ASTM Method D683-72
[b]Measured using ASTM Method D256-73 using a notch radius of 0.25 mm
[c]Measured using the Vertical Burning Test of Underwriters Laboratories Specification No. 94 using samples 1.6 mm thick.

These results show that increased mechanical strength is obtained by the direct moulding method and that the composition gives a fire retardancy which is indistinguishable from that obtained from the other methods examined. It was also seen that the direct moulded material gave much whiter mouldings.

EXAMPLE 4

The masterbatch granules of Example 2 were blended in the weight ratio 30:70 with nylon 66 granules and the blend was injection moulded into shaped articles (a) by direct injection moulding and (b) after extrusion compounding as described in Example 3. In a comparative example an identical composition, prepared by a single stage extrusion of all the individual ingredients with the exception of the nylon 6 carrier, was injection moulded. The mechanical and fire-retardant properties obtained from the three compositions were not so significantly different as the reinforced compositions compared in Example 3 but the directly moulded sample again showed improved colour. The results obtained were as follows.

| Run | Composition | Tensile Strength (MN/m$^2$) | Notched Impact Strength (KJ/m$^2$) | Fire Retardancy 50% RH 48 hr | Fire Retardancy 70° C. 7 days |
|---|---|---|---|---|---|
| 4 | (a) 30 parts product of Ex. 2 + 70 parts nylon 66 | 63 | 3.6 | VO | VO |
| 5 | (b) Blend as above extrusion compounded | 64 | 3.7 | VO | VI |
| 6 | (c) Composition as (a) except nylon 6 carrier omitted, single stage extrusion compounded. | 52 | 3.2 | VO | VO |

EXAMPLE 5

The masterbatch granules of Example 2 were blended with glass-filled nylon 66 granules containing 40% glass fibre in the weight proportion 30 masterbatch: 70 glass-filled nylon. Comparative testing as described in Example 3 showed that a fire-retardancy rating of 94VO was obtained for the products of the three methods of preparing moulded articles. The tensile strength and colour of the directly injection moulded articles was superior to that prepared by the other methods as seen in the table below.

| Run | Composition | Tensile Strength (MN/m$^2$) | Notched Impact Strength (KJ/m$^2$) | Fire Retardancy | |
|---|---|---|---|---|---|
| | | | | 50% RH 48 hr | 70° C. 7 days |
| 7 | 30 parts product of Ex. 2 70 parts glass filled nylon | 135 | 7.3 | VO | VO |
| 8 | As above, extrusion compounded | 115 | 6.0 | VO | VO |
| 9 | As above, omitting nylon 6 carrier, single stage extrusion compounded. | 121 | 7.0 | VO | VO |

EXAMPLE 6

A fire-retardant masterbatch composition containing 20% by weight of polyethylene were prepared on a steam-heated mill at 140° to 160° C. The fire-retardant composition contained 80% of 'Dechlorane' 515, zinc oxide and zinc stearate in the ratio 11:5.5:0.5. This masterbatch was then extrusion compounded with glass fibre and nylon 66 granules. The granules produced were injection moulded into shaped articles. The table below records results of testing on the shaped articles. A control run omitting the polyethylene but otherwise containing the same ingredients was also prepared by a single stage extrusion process.

| Composition | Tensile Strength MN/m$^2$ | UL94 50% RH for 48 hr | |
|---|---|---|---|
| | | Average | Maximum |
| 28% by weight glass fibre: 21% by weight of masterbatch: 51% by weight of a nylon 66.6 copolymer containing 3% of nylon 6 (based on the copolymer) | 109 | 60 | 72 |
| Control | 120 | 17 | 26 |

The burning test results, shown as average and maximum burning times (in seconds) show that the control sample has a rating of 94VI. In comparison the same composition containing about 4.0% of polyethylene as the fire-retardant carrier has a much poorer burning performance and would be rated as worse than 94V2.

EXAMPLE 7

Masterbatches were prepared having the same compositions as in Examples 1 and 2 except in that the nylon 6 was replaced with a nylon 66.6 copolymer containing the monomers in the ratio 73:27. Compositions were obtained by blending with nylon 66 and glass-filled nylon 66 to match the procedure and compositions of Examples 3, 4 and 5. The copolymer containing masterbatches were found to be marginally superior in some respects to those based on nylon 6 with the advantage that the final blends produced contain only 1 or 2% of polyamide in the form of nylon 6 units. The results obtained by direct injection moulding of compositions corresponding to those of Examples 3 and 5 were as follows.

| Run | Composition | Tensile Strength (MN/m$^2$) | Notched Impact Strength (KJ/m$^2$) | Fire Retardancy | |
|---|---|---|---|---|---|
| | | | | 50% RH 48 hr | 70° C. 7 days |
| 10 | 21 parts product of Ex. 1 with nylon 6 carried replaced by 73:27 nylon 66.6 copolymer + 79 parts glass filled nylon (33% by weight glass) | 139 | 9.1 | VI | VI |
| 11 | 30 parts product of Ex. 2 with nylon 6 carrier replaced by 73:27 nylon 66.6 copolymer + 70 parts glass filled nylon (40% glass) | 134 | 8.2 | VO | VO |

EXAMPLE 8

A masterbatch composition was prepared according to the method of Example 1 to give granules containing 20% by weight of a 73:27 nylon 66.6 copolymer, 25.9% zinc oxide, 51.8% by weight 'Dechlorane' 515 and 2.35% zinc stearate.

EXAMPLE 9

21 Parts by weight of the product of Example 8 was blended with 79 parts of glass filled reinforced nylon 66 granules containing 33% by weight of glass. The blend was directly injection moulded and tested by the method hereinbefore specified. A tensile strength of 127 MN/m$^2$, a notched impact strength of 5.2 KJ/m$^2$ and UL94 rating of VI were obtained. The colour of the mouldings were better than those formed from the same composition which had been fully compounded in a single operation.

We claim:

1. A polyamide masterbatch composition comprising at least 10%, based on the total weight of the composition, of a high molecular weight fibre forming polyamide with a melting point of 230° C. or below and at least 60%, based on the total weight of the composition, of fire retardant additives selected from the group consisting of halogenated fire retardant organic compounds and a mixture of halogenated fire retardant organic compounds and at least one synergist for the halogenated compounds.

2. A method of producing a fire retardant polyamide composition comprising forming a masterbatch composition comprising an intimate blend of at least 60% by total weight of the masterbatch composition of fire retardant additives selected from the group consisting of halogenated fire retardant organic compounds and a mixture of halogenated fire retardant organic compounds and at least one synergist for the halogenated compounds, and at least 10% by total weight of the masterbatch composition of a high molecular weight fibre forming polyamide with a melting point of 230° C. or below.

3. A polyamide masterbatch composition according to claim 1 in which the polyamide is nylon 6 or a copolymer of nylon 66.

4. A polyamide masterbatch composition according to claim 1 containing at least 60% by weight of halogenated organic compounds and a synergist for the halogenated compounds the weight ratio of halogenated compounds to synergist being between 5:1 and 1:2.

5. A fire retardant polyamide composition comprising a dry blend of from 5 to 50% by weight of granules of a polyamide masterbatch composition according to claim 16, from 95 to 50% by weight of granules of a second polyamide composition comprising a polyamide with a melting point of at least 250° C. and from 0 to 40% by weight of the total composition of other additives, the combined percentage of masterbatch composition, second polyamide composition and other additives totalling 100%.

6. A fire retardant composition according to claim 5 in which the final composition contains from 15 to 50% by weight of the polyamide masterbatch composition.

7. A fire retardant composition according to claim 4 in which the polyamide of the second polyamide composition is a polymer or copolymer of nylon 66.

8. A polyamide masterbatch composition according to claim 1 in which the fire retardant materials comprise a mixture of at least one chlorinated organic compound and a synergist selected from at least one of the oxides of antimony, tin, zinc, iron and molybdenum oxide, mixed oxides thereof and zinc borate.

9. A fire retardant composition according to claim 5 in which the fire retardant materials comprise a mixture of at least one chlorinated organic compound and a synergist selected from at least one of the oxides of antimony, tin, zinc, iron and molybdenum oxide, mixed oxides thereof and zinc borate.

10. A method of producing a fire retardant polyamide composition comprising blending 5 to 50% by weight of a polyamide masterbatch composition according to claim 11 with from 95 to 50% by weight of a second polyamide composition comprising a polyamide with a melting point of at least 250° C. and from 0 to 40% by weight of the total composition of other additives the combined percentage of masterbatch composition, second polyamide composition and other additives totalling 100%.

11. A method according to claim 10 in which the blending is carried out under melt conditions so that a uniform mixture of the total composition is formed.

12. A method according to claim 10 in which the composition is formed by dry blending granules of the masterbatch composition according to claim 11 with granules of the second polyamide composition.

13. A method according to claim 10 in which the polyamide of the second polyamide composition is a polymer or copolymer of nylon 66.

* * * * *